US007630345B2

(12) United States Patent
Liu

(10) Patent No.: US 7,630,345 B2
(45) Date of Patent: Dec. 8, 2009

(54) HRPD NETWORK ACCESS AUTHENTICATION METHOD BASED ON CAVE ALGORITHM

(75) Inventor: Weimin Liu, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 1093 days.

(21) Appl. No.: 10/949,567

(22) Filed: Sep. 24, 2004

(65) Prior Publication Data

US 2005/0099981 A1 May 12, 2005

(30) Foreign Application Priority Data

Sep. 26, 2003 (CN) ............................. 03 1 60121
Feb. 16, 2004 (CN) ....................... 2004 1 0050628

(51) Int. Cl.
*H04B 7/216* (2006.01)
(52) U.S. Cl. ..................... 370/335; 370/342; 455/435.1
(58) Field of Classification Search ........................ None
See application file for complete search history.

(56) References Cited

U.S. PATENT DOCUMENTS 6,928,558 B1 * 8/2005 Allahwerdi et al. ............ 726/9
7,389,105 B2 * 6/2008 Ala-Laurila et al. .......... 455/406
7,418,596 B1 * 8/2008 Carroll et al. ................ 713/169
2003/0157926 A1 * 8/2003 Ala-Laurila et al. .......... 455/406
2004/0128561 A1 * 7/2004 Bouchat et al. .............. 713/202
2004/0219905 A1 * 11/2004 Blumenthal et al. .......... 455/411
2005/0078824 A1 * 4/2005 Malinen et al. .............. 380/247
2005/0090232 A1 * 4/2005 Hsu ........................... 455/411
2006/0013393 A1 * 1/2006 Ferchichi et al. ............ 380/247
2006/0050680 A1 * 3/2006 Naim et al. .................. 370/352
2006/0121895 A1 * 6/2006 Zou et al. .................... 455/433
2006/0129807 A1 * 6/2006 Halasz et al. ................ 713/163
2008/0026740 A1 * 1/2008 Netanel ....................... 455/419

* cited by examiner

*Primary Examiner*—Ajit Patel
(74) *Attorney, Agent, or Firm*—The Farrell Law Firm, LLP

(57) ABSTRACT

A HRPD network access authentication method based on CAVE algorithm is proposed. An AT generates a random number "RAND" necessary for the calculation of AUTH1 by using the "Random text" included in the CHAP Challenge message. A UIM card works out the AUTH1 by using the random number "RAND" and the SSD_A in the UIM card. The AT carries the AUTH1 by the Result field of the CHAP Response message. The AN-AAA generates the random number "RAND" necessary for the calculation of AUTH2 by using the "Random text" included in the Radius Access Request message. The AN-AAA works out the AUTH2 by using the random number "RAND". The two results AUTH1 and AUTH2 is compared. If they are just the same, the authentication on the AT passes. Otherwise, the AT is rejected to access.

27 Claims, 5 Drawing Sheets

HRPD NETWORK ACCESS AUTHENTICATION METHOD BASED ON CAVE ALGORITHM

BACKGROUND OF THE INVENTION

1. Field of the Invention

The present invention relates to mobile communication's access authentication, especially to the HRPD(High Rate Packet Data), EV/DO, network access authentication method based on CAVE (Cellular Authentication and Voice Encryption) algorithm.

2. Description of the Prior Art

CDMA2000 1X network has been widely applied commercially over the world. In this kind of network, the Challenge Handshake Authentication Protocol (hereinafter referred to simply as CHAP) based on CAVE algorithm has been adopted to identify the validity of the access terminals. This authentication system has comparatively perfect methods for protecting from illegal attack. A mobile station's (hereinafter referred to simply as MS) privacy key (A-key) and the CAVE algorithm (hereinafter referred to simply as CAVE) are stored in the mobile station and the 1x network's authentication center respectively.

The authentication process mainly includes such two procedures as the updating of shared secret data (SSD) and the performing of authentication. Part A of the shared secret data (SSD_A) is used for access authentication. According to specific conditions, the network sends a message including a segment of random numbers to an MS and the authentication center respectively, in order to update the SSD_A data. After the message is received by the MS and the authentication center respectively, the included random numbers, the A-key and other parameters are together input into the "SSD_GENEREATION PROCEDURE" so as to generate a new SSD_A after calculation. After validity identification, the new SSD_A takes the place of the old one and will be used as the privacy key for access authentication. When an authentication is needed to be done on a subscriber terminal, the network sends the authentication request message to the MS and the authentication center including a segment of random numbers. After the message is received by the MS and the authentication center respectively, the authentication result will be worked out by using the random numbers included in the message, the SSD_A and other parameters to be input into the CAVE algorithm. The MS sends the authentication result to the authentication center. By comparing the similarities and differences between the authentication results, the authentication can be identified as valid or not. To prevent any vicious users from stealing the subscriber' keys, SSD_A (which is used as the temporary privacy key) can be updated frequently. Therefore, this authentication mode has very high level of security. In practice, the A-key can be located in two modes. One is that it is stored in the MS, and corresponding CAVE algorithm is also implemented in the MS. In this case, it is called a host-card-not-separated mobile station; The other is that the A-key is stored in the User Identity Module (hereinafter referred to as the UIM card), and the corresponding CAVE algorithm is also implemented in the UIM card. In this case, it can be called a host-card-separated (removable UIM card) MS. At present, only the host-card-separated MS is available in China, whereas the host-card-not-separated MS is available in most foreign countries. HRPD network is the upgrade one of CDMA2000 1X network and has been gradually adopted in commercial application all over the world. In practical commercial application, the HRPD network generally shares the same packet data core network (which is mainly composed of the PDSN and the AAA) with the CDMA2000 1X network. As prescribed in the corresponding specifications of the 3G Partnership Project 2 (hereinafter referred to simply as 3GPP2), if the access authentication is adopted by the HRPD network, the authentication mode should also be the CHAP authentication one, but no detailed encryption algorithm is specified explicitly, which can be specified by the specific operator. Just like the CDMA2000 1X network, by the location where the privacy key is stored, HRPD's access terminals (referred to simply as AT) can be also divided into such two kinds as host-card-separated AT and host-card-not-separated AT.

Both HRPD network and the CDMA2000 1x network are independent one another. No information exchanges between them except that they share the same packet data core network. Because the HRPD network mainly provides subscribers with data service, the subscribers can enjoy the services through the dual-mode terminals that support both CDMA2000 1x network and the HRPD network, and this kind of subscribers are the main subscribers group of HRPD network. In practice, normally, it is provided a voice service/data service by means of the CDMA2000 1x network and a high speed packet data service by means of the HRPD network. Therefore, the dual-mode terminals that support not only the CDMA2000 1x network but also the HRPD network will take up a sizable share. Because CDMA2000 1x network is generally established ahead of the HRPD network, the existing MSs in CDMA2000 1x network, whether the host-card-separated MS or the host-card-not-separated MS, support only the CAVE algorithm during the authentication process. In order to support the dual-mode operation, the MSs must be upgraded to support not only the CAVE algorithm but also the HRPD network's access authentication algorithms like the MD5 algorithm. For example, for a host-card-separated terminal, its UIM card is needed to be upgraded to a multi-mode one so as to support both the two kinds of authentication. Because of a great deal of subscribers, it takes a great deal cost to upgrade the UIM card, and brings an inconvenience to the subscriber.

Accordingly, on the premise that the CDMA2000 1x network has been launched into operation and possesses a lot of subscribers, how to realize the dual-mode terminal's access authentication with a minimal cost is a challenge to the HRPD network construction.

It is needed that the existing removable UIM card which has CAVE algorithm can be used for hybrid HRPD terminal (cdma2000 1x and HRPD dual mode terminal) to authenticate the terminal with an AN-AAA server which have the CAVE algorithm.

SUMMARY OF THE INVENTION

The object of the present invention is to provide a method for the HRPD network access authentication by using the CAVE algorithm adopted by the present CDMA2000 1x network without changing the HRPD message stream.

The object of the present invention is to provide a method for the HRPD network access authentication by using the CAVE algorithm adopted by the present CDMA2000 1X network with a removable UIM card which can be used for cdma2000 1x authentication.

The object of the present invention is to provide a method for the HRPD network determines hybrid access terminal (cdma2000 1x and HRPD dual mode terminal) whether it use CAVE algorithm and cdma2000 1x access network credentials (ie. SSD).

The object of the present invention is to provide a method for operating a hybrid access terminal (HAT) to obtain authentication from the HRPD network by using removable UIM card which have CAVE algorithm used for cama2000 1x network authentication.

The object of the present invention is to provide a method for AN-AAA to determines authentication of a HAT using removable UIM card which have CAVE algorithm used for cama2000 1x network authentication.

The object of the present invention is to provide a HRPD authentication service method for HRPD network operator by using plurality of access network(AN)/PCFs, a AN-AAA server which is coupled to the AN/PCFs, plurality HRPD BSS(Base Station Subsystem) coupled with the AN/PCFs, plurality cdma2000 1x BSS(Base Station Subsystem) which communicate with a HAT having removable UIM card including CAVE algorithm and a HLR/AC which coupled to the AN-AAA server including CAVE algorithm.

To achieve the aim mentioned above, it is provided an access authentication method based on standard HRPD message flow and the CAVE algorithm. If the HRPD network needs authentication of a AT, the HRPD system send a CHAP message including "Random text" to the AT. The operation method comprises the following steps:

1. The AT generates a random number "RAND" necessary for the CAVE algorithm by using the "Random text" included in the CHAP Challenge message;

2. A UIM card works out an AUTH1 by using said random number "RAND" and the SSD_A exist in the UIM card, which can be up-dated from the cdma2000 1x network;

3. The AT send AUTH1 to an AN-AAA server by using the Result field of the CHAP Response message;

4. An AN-AAA generates a random number "RAND" necessary for the calculation of AUTH2 by using the "Random text" included in the Radius Access Request message;

5. The AN-AAA works out the AUTH2 by using said random number "RAND" and SSD_A which is obtained from CDMA2000 1x network; 6. The two results AUTH1 and AUTH2 is compared, and if they are just the same, the authentication of the AT passes; otherwise, the AT is rejected to access.

In the steps above, the SSD_A in AN-AAA is obtained from the CDMA2000 1x network.

The method for obtaining the SSD_A is as follows:

The AN-AAA obtains the SSD_A by means of the HLR/AC of the CDMA2000 1x network. In this case, it is necessary to establish an ANSI-41 channel between the AN-AAA and the HLR/AC. AN-AAA is regarded virtually as a VLR of the cdma2000 1x network. And the sharing of SSD_A between AN-AAA and HLR/AC is realized by the ANSI-41 messaging.

The present invention is adapted for settling the access authentication problem for the dual-mode terminals in accepting the services from both the CDMA2000 1x network and the HRPD network with one removable UIM card including CAVE algorithm and a SSD of cdma2000 1x network. In this invention, neither the HRPD network's messaging flow is needed to be modified, i.e., no modification is needed to be done to the existing HRPD network access equipments, nor the UIM cards applied in the CDMA2000 1x network are needed to be modified, but only a few modifications are needed to be done to the dual-mode terminals and the AN-AAAs to thus realize a dual-mode terminal's access authentication in the HRPD network. Its security remains the same level as that of the CDMA2000 1x network.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The main object of the present invention is to realize the HRPD network's authentication without changing the UIM card used widely by the CDMA2000 1x MS and changing the HRPD network's authentication flow. The cost to implement the solution is to add a new function to the AT and the corresponding cooperation of AN-AAAs. However, after the cdma2000 1x network has been upgraded to HRPD+cdma2000 1x network, the access terminals per se must be changed. In the present solution, only a few modifications are needed to be done to the ATs, i.e., only a few requirements are needed to be imposed on the newly-changed ATs. So it is very easy to implement. In addition, because that AN-AAAs are very few (let's take China as an example, one unit per province in general), and its functions are realized normally through software, so it is very easy to make modifications to the AN-AAAs. In general, with the present solution, a notable benefits will be obtained at very little cost by practicing the present solution.

The present invention is based on the following facts that HRPD network does not support the CAVE algorithm, and there is no message stream to support SSD update in HRPD network, whereas the SSD update process is essential to the CAVE algorithm. But the existing subscribers' UIM cards provide only the CAVE algorithm. The main idea of the present invention is to make the existing HRPD message streams support the CAVE algorithm by processing the parameters included in the message stream of the HRPD network and using the SSD update result in the cdma2000 1x network, to thereby achieve the goal that the existing subscribers' UIM cards are not necessary to be changed.

After the 1x network has evolved to the 1x+HRPD network, some new HRPD single-mode subscribers will emerge. Without this invention, this kind of new subscribers has nothing to do with any old UIM card. They can ask the operator for new UIM cards that support the MD5 algorithm. But it is very inconvenient for the user. Therefore it is very important for the network operator to hold the cdma2000 1x user for the HRPD user. The authentication problem can also be well settled for this kind of subscribers by using the present invention.

Figure 2:
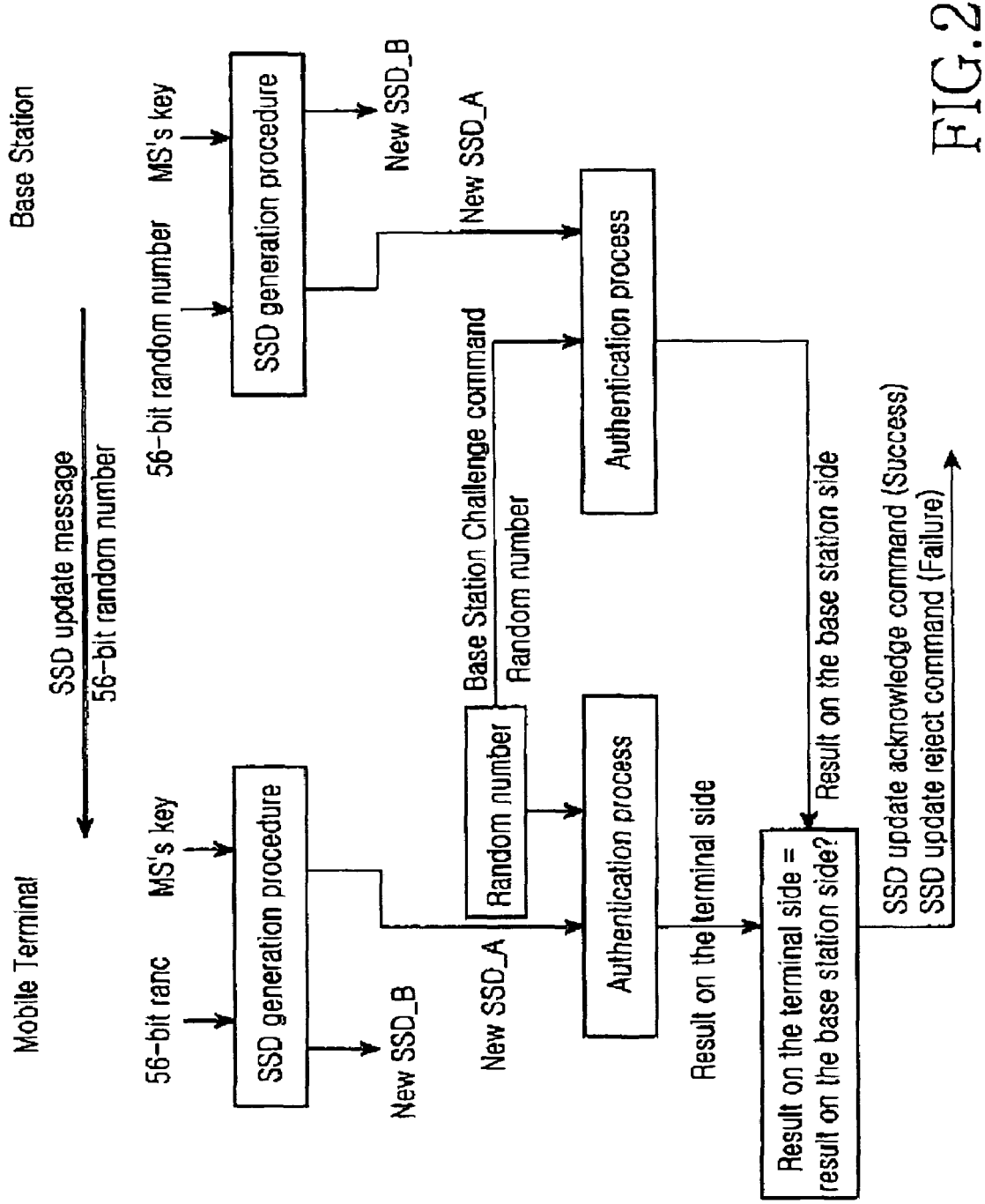
FIG. 2 shows the update process of the shared secret data (SSD) in the cdma2000 1x network.
Figure 3:
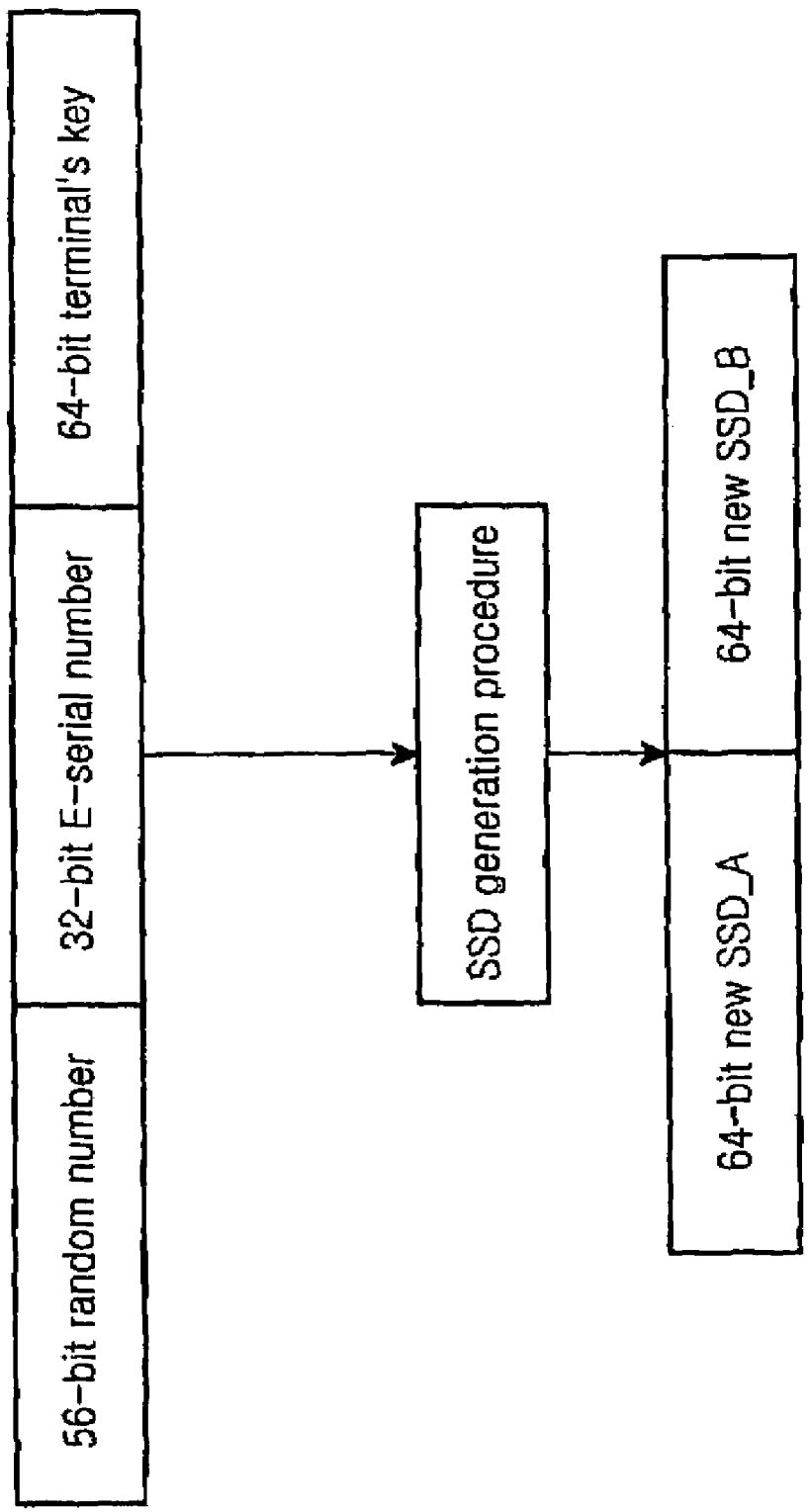
FIG. 3 shows the SSD generation procedure.
Figure 4:
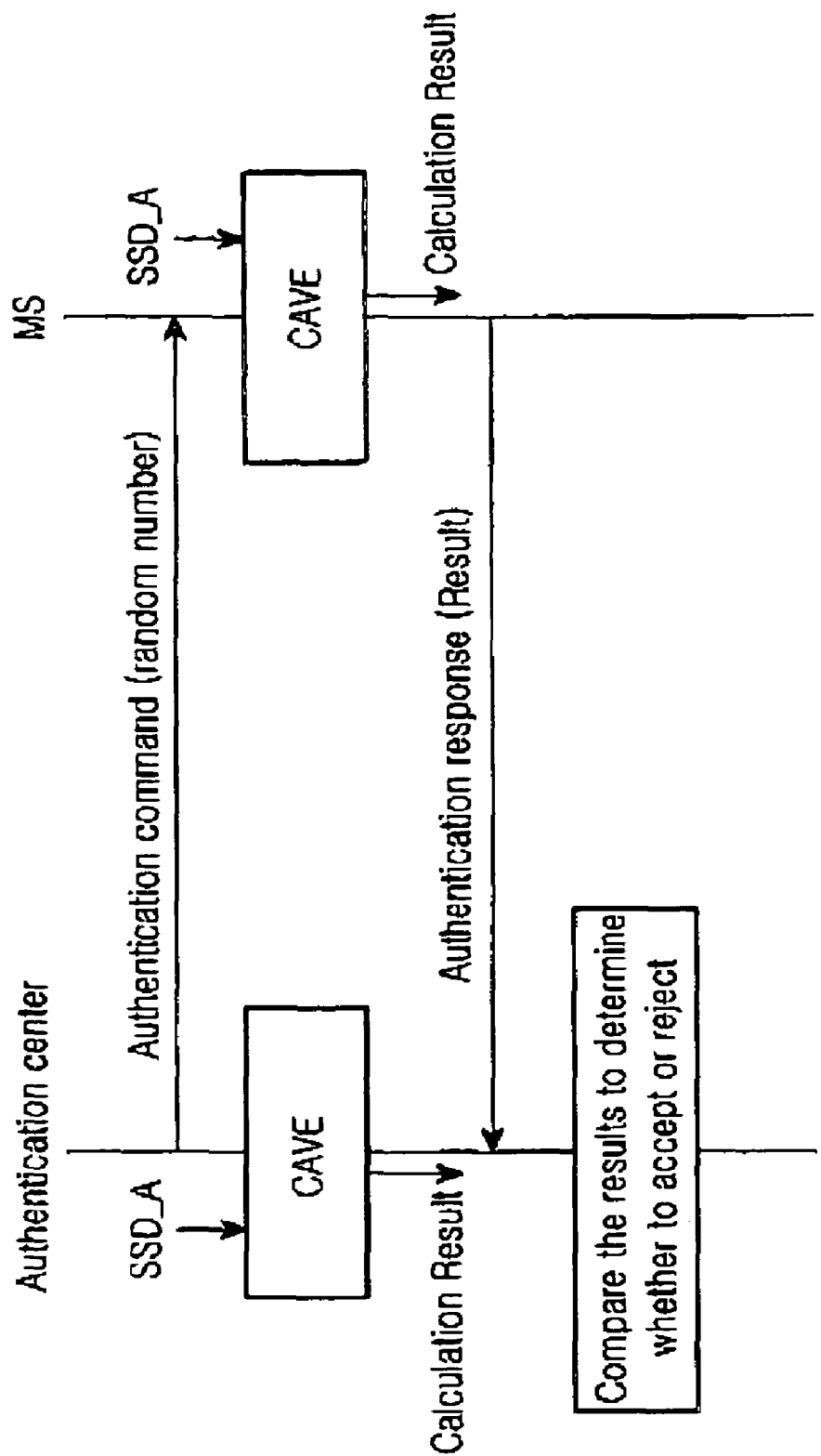
FIG. 4 illustrates the CAVE authentication process.
Figure 5:
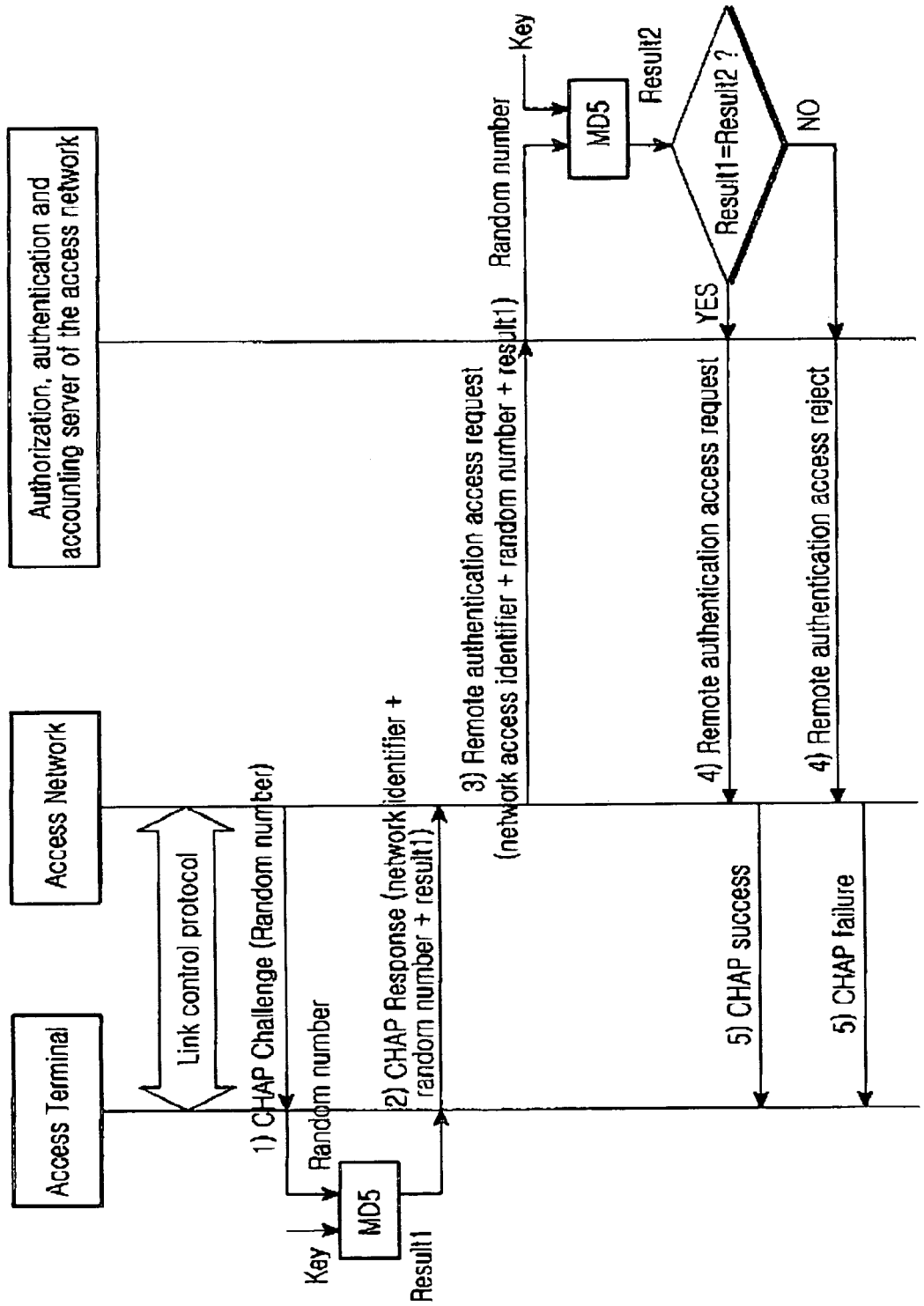
FIG. 5 shows the access authentication message stream that 3GPP2 defines for the HRPD network.

In order to better understanding the present invention, FIG. 2, FIG. 3 and FIG. 4 show the operation process on the MS side during the CDMA2000 1x network's authentication procedure, and FIG. 5 shows the message stream when the access authentication is performed in the HRPD network.

1) The Operation Process on the MS Side During the CDMA2000 1x Network's Authentication Procedure.

The operation on the MS side during the CDMA2000 1x network's authentication procedure is divided such processes as the SSD_A update process and the authentication process.

The SSD_A update process aims at improving the authentication system's capability of attack-protecting. The basic operation process is illustrated in FIG. 2:

The update of SSD_A is accomplished by means of SSD_A's generation procedure. The MS information, the random numbers and the A-key are the input parameters to SSD_A generation procedure. The A-key is 64-bit long, which is allocated to an MS by the operator. Only the MS and the network authentication centre (AC) know the corresponding A-key. In a practical network, the AC is incorporated with the Home Location Register (i.e., HLR), which is referred as the HLR/AC.

The SSD_A update process is as follows:

The Base Station sends a SSD_A Update Message to MS and the AC, the message including a 64-bit-length random number, called as RANDSSD. After receiving the SSD_A Update Message, the MS inputs parameters into the SSD_A generation procedure as shown in FIG. 3, and performs the SSD_A generation procedure to generate a result called as a new shared secret data SSD_A_NEW.

Then, the MS generates a 32-bit random number RANDBS and sends it to the Base Station by the Base Station Challenge Order message.

Both the MS and the Base Station take the RANDSSD and the newly generated SSD_A_NEW as the input of the Auth_Signature Procedure, in order to work out the results AUTHBS of 18-bit. Then, the Base Station sends the AUTHBS to the MS by a Base Station Challenge Confirmation Order message. The MS compares the result transmitted from the Base Station with that worked out by itself. If they are just the same, SSD_A update process completes successfully, and the MS will define the SSD_A_NEW as SSD_A; otherwise, the old SSD_A should be still used.

The authentication process is a process of identifying the validity of the terminals. Its basic operations are illustrated in FIG. 4:

AC sends a Challenge message to an MS, the message including a 32-bit long random number RAND. The MS takes the RAND and the SSD_A as the inputs of the CAVE algorithm in order to work out an 18-bit long result AUTH. Then the MS sends the AUTH to the authentication center by an Authentication Challenge Response message. The authentication center compares the result worked out by the MS with the result worked out by itself in the same method. If they are just the same, the authentication passes; Otherwise, the access of the MS is rejected.

Because of the roaming problem, in network implementations, SSD_A is generally shared between the HLR/AC and the Visitor Location Register (VLR) which is close to the subscriber, in order to enhance the speed of the access authentication and reduce network transmission. The connection between the VLR and the HLR/AC is realized via the D-interface in the Mobile Application Protocol (MAP) ANSI-41 prescribed by the American National Standardization Institute (ANSI), through which the ANSI-41 message is transmitted.

(2) The Message Streams of the Access Authentication in the Existing HRPD Network HRPD network's access authentication includes the following message streams as shown in FIG. 5:

1) The access network (AN) sends a CHAP Challenge message to an access terminal (AT), the message including the random number "Random text". The AT receives the CHAP Challenge message, and then works out the authentication result "Result1" by using the received random number. In the figure, the encryption algorithm MD5 is taken as an example.

2) The AT sends a CHAP Response message to AN, the message including such information as the AT's Network Access Identifier (NAI), the random number "text", the authentication result "Result1" and so on.

3) After receiving the CHAP Response message from the AT, the AN sends a Radius Access Request message to AN-AAA, the message including the three parameters mentioned in 2) and copied from the CHAP Response message; AN-AAA works out the Result2 by the algorithm MD5 by using the random number and the local stored Password (AN-AAA Password is the same as that of AT).

4) AN-AAA compares Result1 with Result2. If they are just the same, it sends a Radius Access Accept message to AN, indicating that the authentication passes. In this message, the IMSI (International Mobile Station Identity) corresponding to the NAI of the AT is included as well, the IMSI being used for later flow by the AN. The map between the IMSI and the NAI is written into the AN-AAA in advance by the operator; If Result1 is not the same as Result2, a Radius Access Reject message is sent to AN to reject the AT access.

5) After receiving the Radius Access Accept message, the AN sends a CHAP Success message to AT, indicating that the authentication process succeeds; And after receiving the Radius Access Reject message, the AN sends a CHAP Failure message to AT, indicating that the authentication process fails.

In the procedures mentioned above, the encryption algorithm MD5 is adopted by the AT and the AN-AAA by way of an example. No definite specification regarding the adoption of encryption algorithms is given in the international standards. It can be specified by the network operator. For the detail understanding about this invention, the 3GPP2 Standard specifications can be a reference of this invention.

To implement the HRPD network's access authentication on the premise that the current UIM cards only support CAVE algorithm and that no modification is made to HRPD's existing message flow, the following improvements on the precedent description would be recommended:

1 The utilization of the CHAP Challenge message in HRPD

As an authentication indication message, the CHAP Challenge message is sent from a HRPD system (ex. AN/PCF) to an AT, the message including the random character "Random text". After being processed, part of this random character can be regarded as the one needed by the CAVE algorithm. Then the part of random character is provided to the CAVE algorithm.

2 Improvement on the dual-mode terminals

A dual-mode terminal accepts not only the CDMA2000 1x network's authentication, but also the HRPD network's authentication. We can make an improvement on the dual-mode terminal to make the two networks share the authentication parameters. The frequent update of the SSD_A in CDMA2000 1x network notably improves the network's capability against the attack. And the HRPD network can gain benefits from the SSD_A update.

In addition, it is necessary for a dual-mode terminal to construct the NAI in such a manner as IMSI@domain name. In it, the IMSI can be read out from the UIM card, and the domain name is stored in the MS in advance.

3 The utilization of the CHAP Response message in HRPD

The CHAP Response message is a response to the CHAP Challenge message from the AN by the AT. In this message, the Result field is defined to carry the authentication result worked out by the AT.

4 An improvement on the AN-AAAs

The Result field in the Radius Access Request message sent from the AN to an AN-AAA includes the authentication result that the AT works out by the CAVE algorithm. The AN-AAA must be able to separate authentication result from Radius Access Request message. Moreover, AN-AAA obtains the SSD_A by means of the HLR/AC of the CDMA2000 1x network. So, it is necessary to establish an ANSI-41 channel between the AN-AAA and the HLR/AC.

The processing to messages is described below.

(1) AT Processing the CHAP Challenge Message

After receiving the CHAP Challenge message from the HRPD network, it is necessary for the AT to process the random number "Random text" included in the received message.

Random text is a string of characters presented in octet, and its length is beyond 32 bits. It is necessary to convert the octet into the binary format and extract 32 bits therefrom.

No special requirements are imposed on the extraction of the 32 bits, as long as the consistency is kept between the AT and the AN-AAA.

The AT uses the 32 bits obtained by the above method as the random number(RAND) that is needed to be input by the CAVE algorithm.

(2) AT Processing the CHAP Response Message

In the CHAP Response message, there are the following three parameter fields: the NAI, the Random text and the Result (AUTH1) which is obtained from the CAVE in the UIM card. It is necessary for the AT to provide AN-AAA with the three parameters. The NAI is required to be stored in the AT (it can be stored in the UIM card in a host-card-separated (removable UIM card) AT) in advance, so it can be read out for use directly. Random text originates from the CHAP Challenge message. Here, the AT performs no operation on the Random text, but copies it to the CHAP Response message directly. As for the Result field, it is necessary for the AT to write the result, i.e. AUTH1, worked out by the CAVE algorithm) into this field optionally together with the RANDSSD stored as indicated in (1). The specific format could be contracted with the AN-AAA for identification by the AN-AAA.

If the AN-AAAs can obtain the SSD_A by means of the HLR/AC, the Result field of the Chap Response message need not include any RANDSSD, but only include the AUTH1.

(4) AN-AAA Processing the Radius Access Request Message

The Radius Access Request message includes three parameters (the NAI, the Random text and the Result (AUTH1)) which are copied from the CHAP Response message by the HRPD system. After the AN-AAA receives the Radius Access Request message from the system, it identifies the Result provided by AT from the Result field known between AN-AAA and the AT.

Based on the Random text, the AN-AAA extracts the 32-bit random number by the same processing method as that of the AT. The AN-AAA inputs the 32-bit random number into the CAVE algorithm together with the SSD_A obtained by the above method and any other parameters, so as to work out the AUTH2, and then compares it with AUTH1. If they are just the same, the authentication of the AT passes; otherwise, the AT is rejected to access.

The above authentication solution based on CAVE algorithm is suitable for the dual-mode terminals of HRPD and the 1x. As for the single-mode terminals of HRPD, other encryption methods (the MD5 is taken as an example in the following explanations) can be adopted. Because of the different encryption algorithms, it is necessary for the AN-AAA to determine whether the AT is using CAVE algorithm and cdma2000 1x access network credentials (ex. SSD_A) (dual-mode terminal) or MD5 algorithm (single-mode terminal), so as to make the present solution be compatible for different kinds of terminals. One of the following methods for judging could be used.

Method 1:

Since the NAI value is the unique identifier of a terminal, and the NAI value is repeated for each other, the AN-AAA can judge the terminal whether use CAVE algorithm (dual-mode terminal) or MD5 algorithm (single-mode terminal) according to the NAI values. A list in which the NAI values are corresponding to the terminal types is necessary to be stored in the AN-AAA in advance. For the convenience of judgment, the operator can collect the NAI values of the single-mode terminals in a specific field, or set a special flag bit for them.

Method 2:

The AN-AAA does not perform any process on the parameters included in the Radius Access Request message, but works out a result by the MD5 algorithm, and then compares this result with the result sent by the AT. If they are just the same, the authentication passes; otherwise, the AN-AAA processes the parameters included in the Radius Access Request message as previously described, and compares the result based on CAVE algorithm with the result sent by the AT, if they are just the same, the authentication passes; otherwise, the AT is rejected to access the network.

Method 3:

The order of the CAVE algorithm and the MD5 algorithm in Method 2 is reversed, i.e., AN-AAA first processes the parameters included in the Radius Access Request message and works out a result by the CAVE algorithm, and compare this result with the result sent by the AT. If they are just the same, the authentication passes; otherwise, the AN-AAA calculates a result by MD5 algorithm by using the original parameter included in the Radius Access Request message, and compares this result with the result sent by the AT, if they are just the same, the authentication passes; otherwise, the AT is rejected to access the network.

Figure 1:
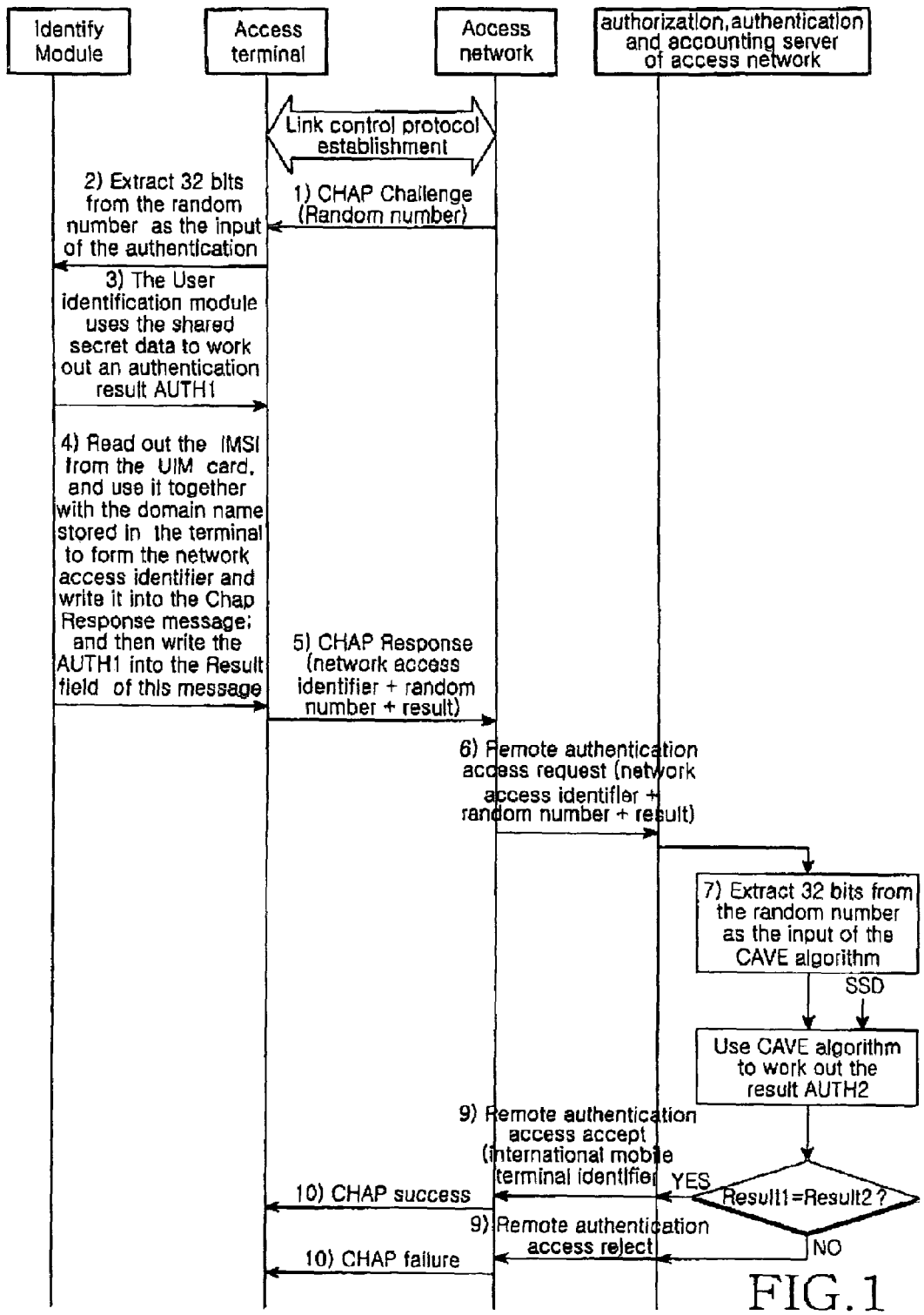
FIG. 1 is the flowchart of HRPD authentication based on CAVE algorithm.

FIG. 1 is the flowchart of the HRPD authentication based on the CAVE algorithm (here, a host-card-separation AT is taken as an example). Each operation step is described in detail as follows:

1 The HRPD system (AN) sends a CHAP Challenge message to the AT, the message including the random character (or number) "Random text";

2 The AT obtains 32 bits from the Random text as the random number "RAND" for the authentication process and sends to the removable UIM card;

3 the UIM card works out the authentication result AUTH1 by using the SSD_A which can be up-dated from the cdma2000 1x network, the RAND and other parameters based on the CAVE algorithm, and sends it to the AT;

4 The AT reads out the IMSI from the UIM card, and constructs the NAI value together with the domain name stored in advance;

5 The AT writes the NAI into a corresponding area of a CHAP Response message, copies the random number "Random text" included in the CHAP Challenge message to the corresponding area of the CHAP Response message, and writes the AUTH1 into the Result field of this message, then sends this CHAP Response message to the system (AN);

6 The system (AN) copies the parameters included in the CHAP Response message to the Radius Access Request message, and sends this message to the AN-AAA;

7 The AN-AAA obtains 32 bits from the Random text as the random number "RAND" for the authentication process, and inputs it together with the SSD_A which can be obtained from cdma2000 1x network (ex. HLR/AC) into the CAVE algorithm;

8 AN-AAA works out the result AUTH2 by the CAVE algorithm;

9 the two results is compared. If they are just the same, A Radius Access Accept message is sent to the AN; otherwise, A Radius Access Reject message is sent to the AN;

10 The AN sends the CHAP Success or CHAP Failure message to the AT correspondingly.

The process that the AN-AAA performs on different kinds of the terminals is omitted in above procedures. The process method can be performed according to one of the three methods listed in the previous description. It is to be noted that in the case of roaming, since the authentication process is performed in the AN-AAA at the home location, i.e., in step 6, the AN sends the Radius Access Request message to the AN-AAA at the home location according to the NAI values. The judging process is accomplished in the AN-AAA at the home location. So, the above flow has no effect on the roaming of the AT.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An HRPD (High Rate Packet Data) network access authentication method based on a CAVE (Cellular Authentication and Voice Encryption) algorithm, comprising the steps of:

generating, by an AT (Access Terminal), a random number "RAND" necessary for the CAVE algorithm, by using a CHAP (Challenge Handshake Authentication Protocol) challenge message;

generating, by a removable UIM (User Identity Module) card, which includes the CAVE algorithm, a first result "AUTH1" that the removable UIM card works out by the CAVE algorithm by using said random number "RAND" in the removable UIM card;

sending, by the AT, the AUTH1 by using a CHAP response message;

generating, by an AN-AAA (Access Network-Authentication Authorization and Accounting) server that includes the CAVE algorithm, the random number "RAND" by using an access request message;

generating, by the AN-AAA server, a second result "AUTH2" by using said random number "RAND"; and comparing the first and second results AUTH1 and AUTH2, and if AUTH1 and AUTH2 are equal, the AT passes an authentication.

2. The method as defined in claim 1, wherein the CHAP Response message includes parameter fields such as a NAI (Network Access Identifier), a Random text and the AUTH1, in which a Result field is used for storing the AUTH1 that the removable UIM card works out by the CAVE algorithm.

3. The method as defined in claim 1, wherein the CHAP response message includes a parameter field NAI (Network Access Identifier), which is constructed through a combination of an IMSI (International Mobile Station Identity) in the removable UIM card and a domain name in the AT.

4. The method as defined in claim 1, wherein an Access Request message includes such parameter fields as an NAI (Network Access Identifier), the Random text and the AUTH1, in which a Result field is used for storing the AUTH1 that the removable UIM card works out by the CAVE algorithm.

5. The method as defined in claim 1, wherein the method adopted by the AN-AAA server for calculating the AUTH2 is the same as a method adopted by the removable UIM card for calculating the AUTH 1.

6. The method as defined in claim 1, wherein further comprising determining whether the AT uses the CAVE algorithm of the AN-AAA sever.

7. The method as defined in claim 6, wherein the AT is identified according to a NAI (Network Access Identifier).

8. The method as defined in claim 6, wherein the AN-AAA server performs no process on the-parameters included in the Access Request message, works out a result by an MD5 (Message-Digest 5) algorithm, and then compares the result of the MD5 algorithm with the result sent by AT, and if the result of the MD5 algorithm and the result sent by the AT are the equal, the AT passes the authentication; otherwise, the AN-AAA server processes the parameters included in the Access Request message, works out a result based on the CAVE algorithm, and compares the result based on the CAVE algorithm with the result sent by the AT, wherein if the result sent based on the CAVE algorithm and the result sent by the AT are equal, the AT passes authentication and if the result based on the CAVE algorithm and the result sent by the AT are not equal, the AT is denied to access.

9. The method as defined in claim 6, wherein the AN-AAA server first processes the parameters included in the Access Request message, works out a result through the CAVE algorithm, and then compares the result of the CAVE algorithm with the result sent by the AT, and if the result of the CAVE algorithm and the result sent by the AT are the same, the AT passes authentication; otherwise, the AN-AAA server works out a result by an MD5 (Message-Digest 5) algorithm by using the original parameters included in the Access Request message, and then compares the result by the MD5 algorithm with the result sent by the AT, if the result by the MD5 algorithm and the result sent by the AT are equal, the AT passes authentication, and if the result by the MD5 algorithm is not equal to the result sent by the AT, the AT is denied access the network.

10. The method as defined in claim 1, wherein the removable UIM card generates the AUTH1 using an SSD (Shared Secret Data) with the RAND.

11. The method as defined in claim 10, wherein the SSD used in the removable UIM card can be used in a CDMA (Code Division Multiple Access) 2000 1x network access authentication.

12. The method as defined in claim 10, wherein the SSD necessary for the CAVE algorithm in the AN-AAA server originates from a CDMA (Code Division Multiple Access) 2000 1x network authentication center.

13. The method as defined in claim 10, wherein the random number RAND is obtained from a "Random text" included in the CHAP challenge message or the access request message.

14. The method as defined in claim 13, wherein the AN-AAA server operates as a VLR (Visitor Location Register) of the CDMA2000 1x network when the AN-AAA server needs to get the SSD from the CDMA2000 1X network authentication center.

15. A HRPD (High Rate Packet Data) network access authentication method based on a CAVE (Cellular Authentication and Voice Encryption) algorithm, comprising the steps of:

receiving, by a CDMA (Code Division Multiple Access) 2000 1x and an HRPD HAT (Hybrid Access Terminal) including a removable UIM (User Identity Module) card, a CHAP (Challenge Handshake Authentication Protocol) challenge message from an HRPD system;

generating, by the removable UIM (User Identity Module) card, which includes the CAVE algorithm, a first result "AUTH1" that the removable UIM card works out by the CAVE algorithm by using the CHAP challenge message in the removable UIM card;

sending, by the HAT, the AUTH1 with an identification of the HAT by using a CHAP response message to an HRPD system;

transmitting, by the HRPD system, the AUTH1 and the identification by using an access request message;

generating, by an AN-AAA (Access Network-Authentication Authorization and Accounting) server, which includes the CAVE algorithm, a second result "AUTH2" by using the access request message; and transmitting an access accept message to the HRPD system when the first and second results "AUTH1" and "AUTH2" are identical.

16. The method as defined in claim 15, wherein the CHAP challenge message and access request message includes random text, and random numbers "RAND" are obtained from the random text.

17. The method as defined in claim 16, wherein the removable UIM card generates the AUTH1 using an SSD (Shared Secret Data) with the RAND.

18. The method as defined in claim 17, wherein the SSD used in the removable UIM card can be used in a CDMA2000 1x network access authentication.

19. The method as defined in claim 17, wherein the SSD necessary for the CAVE algorithm in the AN-AAA server originates from a CDMA2000 1x network authentication center.

20. The method as defined in claim 16, wherein the AN-AAA server operates as a VLR (Visitor Location Register) of the CDMA2000 1x network when the AN-AAA server communicates with the CDMA2000 1X network authentication center.

21. The method as defined in claim 15, wherein a method adopted by the AN-AAA server for calculating the AUTH2 is the same as a method adopted by the removable UIM card for calculating the AUTH1.

22. The method as defined in claim 15, further comprising determining, at the AN-AAA server, whether the HAT uses the CAVE algorithm.

23. The method as defined in claim 22, wherein the HAT is identified according to an NAI (Network Access Identifier).

24. The method as defined in claim 15, wherein the identification is a NAI (Network Access Identifier).

25. The method as defined in claim 24, wherein the CHAP response message includes parameter fields such as the NAI, a ransom text and the AUTH1, in which a result field is used for storing the AUTH1.

26. The method as defined in claim 24, wherein the CHAP response message includes as a parameter field the NAI, which is constructed by a combination of an IMSI (International Mobile Station Identity) in the removable UIM card and a domain name in the HAT.

27. The method as defined in claim 24, wherein the access request message includes parameter fields such as the NAI, a random text and the AUTH1, in which a result field is used for storing the AUTH1.

* * * * *